United States Patent [19]

Sidor

[11] 3,950,993

[45] Apr. 20, 1976

[54] TEMPERATURE SENSORS WITH IMPROVED OPERATING CHARACTERISTICS UTILIZING MAGNETIC ELEMENTS

[75] Inventor: Edward F. Sidor, Lombard, Ill.

[73] Assignee: Illinois Tool Works Inc., Chicago, Ill.

[22] Filed: Apr. 2, 1975

[21] Appl. No.: 564,578

[52] U.S. Cl. .............................. 73/362 R; 317/133; 323/75 S; 324/34 TE
[51] Int. Cl.² ......................................... G01K 7/38
[58] Field of Search ................. 73/362 R, 362 CP; 323/75 H, 75 S, 75 Q; 317/133; 324/34 TE; 336/179

[56] References Cited
UNITED STATES PATENTS

| | | | |
|---|---|---|---|
| 2,691,130 | 10/1954 | Ingersoll | 323/75 Q |
| 2,756,595 | 7/1956 | Rathenau et al. | 73/362 R X |
| 3,026,471 | 3/1962 | Canfor et al. | 323/92 X |
| 3,154,947 | 11/1964 | Poshadel et al. | 73/362 AR |

*Primary Examiner*—Richard C. Queisser
*Assistant Examiner*—Frederick Shoon
*Attorney, Agent, or Firm*—Glenn W. Bowen; Robert W. Beart

[57] ABSTRACT

Temperature sensors utilizing either one pair or two pair of inductive magnetic elements are disclosed. The inductive elements of each pair are constructed of different magnetic materials so that the permeability of the two elements change at different rates with respect to temperature. A plot of inductance vs. temperature for the two elements, thus, provides curves which intersect at the temperature which is to be sensed. Permanent magnets are positioned adjacent the temperature sensing elements in order to provide a mechanism for adjusting the cross-over temperature point of the magnetic elements.

10 Claims, 8 Drawing Figures

Fig.7a VOLTAGE at TERMINAL 100

TEMPERATURE

Fig.7b VOLTAGE at TERMINAL 112

TEMPERATURE

TEMPERATURE SENSORS WITH IMPROVED OPERATING CHARACTERISTICS UTILIZING MAGNETIC ELEMENTS

BACKGROUND OF THE INVENTION

Magnetic cores, such as toroidal-shaped cores, have been previously used for temperature sensing. The prior art methods of temperature sensing utilized transition characteristics of the magnetic core such as the Curie temperature transition and/or first order transitions such as those described in U.S. Pat. No. 3,534,306; issued on Oct. 13, 1970, in the name of Watrous et al. Prior temperature sensing devices of this type relied on the fact that at a certain temperature a drastic change of the magnetic characteristics of the core would occur. Thus, if a wire were wound around the core to form an inductance element, the inductance of the element would change drastically when the predetermined temperature was reached. This required specific core materials that were specially formulated and carefully controlled in order to provide thhe desired rapid transition at the exact temperature that was desired. A different specially manufactured magnetic core would then have to be substituted in the sensor in order to sense another temperature.

The sensing device of the present invention, by contrast, does not depend upon any rapid change of inductance state of a magnetic core. In the present sensing device, the inductance of the magnetic elements varies in a gradual manner until the inductance of both elements is approximately equal at a predetermined temperature which is then sensed by the sensing circuit. The advantage of this approach over the prior art devices is that by changing the inductance of the element by changing the number of windings coupled to it, the cross-over point where the two inductances are equal may be changed so that the temperature sensor may be used over wide range temperatures.

The present invention is achieved by coupling the two inductively wound elements having different inductance vs. temperature characteristics into a four-arm A.C. inductance bridge circuit having two terminals that are connected to conventional null detector. When the inductance vs. temperature characteristics of the two elements cross at a predetermined temperature, the inductances are equal; and the null detector indicates that the desired temperature has been reached. Although two magnetic cores have been connected in series to achieve temperature compensation, as is shown in U.S. Pat. No. 3,824,502; issued on July 16, 1974, to Bardash et al., the utilization of two series connected magnetic elements that have different temperature characteristics for sensing temperatures over a relatively large range of temperatures without a transition change of the magnetic state of the element was not achieved by the device of the Bardash et al patent.

In a co-pending U.S. patent application, Ser. No. 533,364, entitled Two-Core Magnetic Temperature Sensor, filed in the name of Edward F. Sidor, and assigned to the assignee of the present invention, a temperature sensing circuit utilizing two magnetic cores was described. In this circuit, the two cores were connected into a bridge circuit with two other impedances and were coupled to a sensing circuit, such as a null detector, in order to sense the temperature vs. inductance crossover point at which the inductance of the two cores became equal. As noted above, one advantage of this type of device was that by changing the inductance of the device, the temperature cross-over point could easily be varied; and the temperature sensor could be used over a wide range of temperatures. The prior application contemplated change of inductance by means of varying the number of windings wound on the cores of the two sensing elements. This approach, however, was time consuming since it required disassembly of the sensing unit.

The present invention, by contrast, allows for the adjustment of the temperature cross-over point by movement of one or more permanent magnets which are positioned adjacent the magnetic sensing elements, so that by adjustment of the position of the movable magnets, the permeability of the magnetic elements may be adjusted in order to vary the temperature cross-over point without disassembly of the circuit.

A further advantageous feature of the present invention is that either toroidal-shaped cores or elongated tubular magnetic elements, in which the winding consists of the wire that passes substantially along the axis of the tubular element, may be employed. By making the core elongated and tubular in shape, and by making the length of the permanent magnets so that they are somewhat shorter than the length of the tubular elements, a more precise control is achieved because the amount of saturation of the tubular elements can be closely controlled by positioning of the permanent magnet. This is accomplished by selectively, magnetically saturating a predetermined portion of the elongated magnetic elements. Similar magnetic elements had been previously proposed for use as positional transducers rather than temperature sensors. U.S. patent application Ser. No. 518,310 filed Oct. 29, 1974, in the name of Victor M. Bernin and assigned to the assignee of the present invention shows the use of such elements for a positional sensor.

In addition to employment of a single pair of magnetic elements in a two-arm active bridge circuit, two pairs of magnetic elements may be connected to form a four-arm active bridge circuit which is twice as sensitive as a two-arm active bridge circuit. A similar four-arm active bridge circuit was described in U.S. patent application Ser. No. 507,828 filed Sep. 20, 1974, in the name of Edward F. Sidor and assigned to the assignee of the present invention. In the Sidor U.S. patent application Ser. No. 507,828, however, the magnetic elements were all formed of the same magnetic materials; and the circuit was used in an angular velocity sensor and not a temperature sensor in which the elements of each pair are constructed of different magnetic materials.

In one version of the present invention, a synchronous detector circuit is used. A synchronous detector circuit is also disclosed in U.S. patent application Ser. No. 535,475 filed Dec. 13, 1974, in the name of Edward F. Sidor and Rand J. Eikelberger, which is also assigned to the assignee of the present invention. However, in the Sidor et al application, the synchronous detector was used in a circuit which sensed the Curie transition temperature of two cores so as to provide a temperature hysteresis function. In the present application, the sensing circuit is used with magnetic elements that do not undergo a sharp magnetic transition change, but instead the continuous inductance vs. temperature characteristics of the elements intersect the temperature to be sensed.

DESCRIPTION OF THE DRAWINGS

The present invention is disclosed by reference to the following drawings in which:

FIG. 7a is a chart which shows the voltage output vs. temperature at terminal 112 of the circuit of FIG. 6; and FIG. 7b is a graph of a voltage output vs. temperature at terminal 110 of the circuit of FIG. 6.

TECHNICAL DESCRIPTION OF THE INVENTION

The present invention utilizes a pair of magnetic elements which may be toroidal-shaped cores or elongated tubular elements, and which are coupled with an electrical wire to form a pair of inductance elements. The inductance vs. temperature characteristics of the two elements are purposely made to be different, preferably due to the employment of different materials in each of the elements. The elements 10, 12 are preferably constructed of linear material, as contrasted to a square-loop material used in the device of the previously mentioned Bardash et al patent. One of the magnetic elements of the present invention may be constructed of a material that is commercially sold by the Ferroxcube Corporation under the name Ferroxcube 3E2A, and the other material may be made of Ferroxcube 3D3 material. The inductance of one of the two elements will be less than the other below a predetermined sensing temperature and will be greater than the inductance of the other element above the predetermined sensing temperature. At the predetermined desired sensing temperature, the inductance of both elements will be equal.

Figure 1:
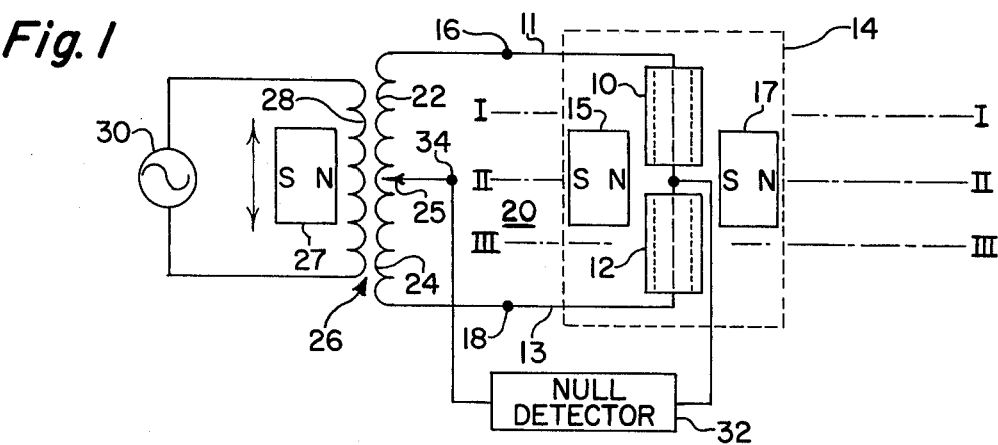
FIG. 1 is a schematic illustration of one circuit that may be used to carry out the present invention which utilizes two magnetic sensing elements of different materials and a null detector circuit.

The inductively coupled sensing elements 10, 12 shown in the schematic of FIG. 1 may be contained in a separate unit 14 which may be positioned at a remote location in order to sense the ambient temperature at that location. The elements 10, 12 are wound or threaded with the conductors 11, 13 which are connected to the terminals 16, 18, respectively, of a four-arm inductive bridge circuit 20. The other two inductive bridge circuit impedances are formed by the secondary windings 22, 24 of a transformer 26. The primary winding 28 of the transformer 26 is coupled to an alternating source of voltage 30. A conventional null detector circuit 32 is connected across the terminals 34, 36 of the bridge circuit 20 to sense when the inductance of the two elements 10, 12 are equal so it can provide an electrical output signal which indicates that the desired temperature has been sensed. The null detector 32 may be replaced by any conventional sensing device or circuit for sensing the output of an A.C. bridge circuit; the design of such devices and circuits being well-known in the art.

Figure 2:
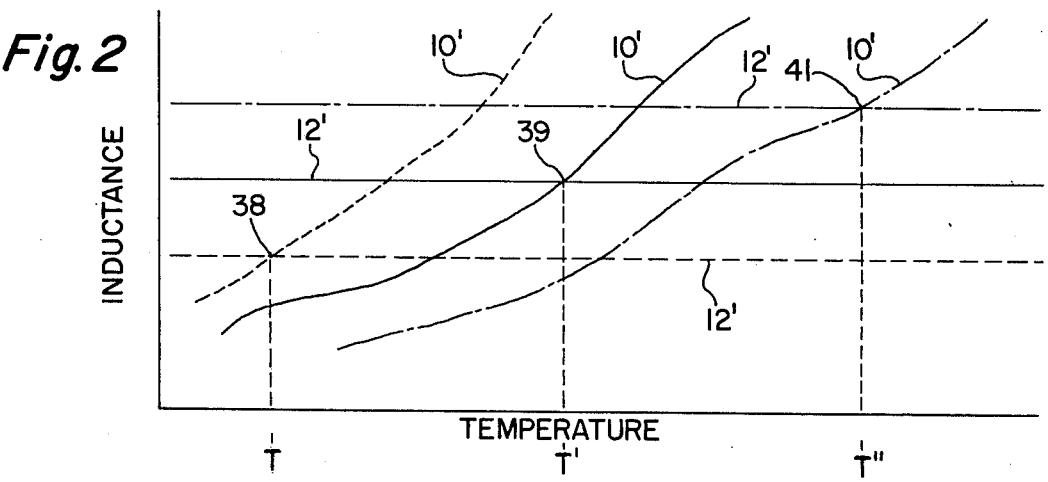
FIG. 2 is a graph which shows the inductance vs. temperature characteristics of the two magnetic elements employed in the circuit of FIG. 1.

An inductance vs. temperature plot for the cores 10, 12 is shown in FIG. 2 where the solid line curves 10', 12' represent the inductance vs. temperature characteristic of the cores. 10, 12 of FIG. 1. It can be seen from this graph that the two curves 10', 12' may intersect at the intersection points 38, 39, 41, which represents temperatures T, T', T'', which may be sensed by the circuit of FIG. 1.

Permanent magnets 15, 17 are positioned adjacent the elements 10, 12. The magnetic field set up between the opposing polarity poles that are adjacent the elements 10, 12 provides a magnetic field across the elements 10, 12 that may partially saturate them if they are toroidal-shaped cores, or may completely saturate the portion of the elements that lie between the magnets 15, 17 if they are elongated tubular members. When the temperature T is to be sensed at the intersection point 38 of the curves 10', 12' of FIG. 2, the magnets are positioned so that they are substantially bisected by the line III—III. If the elements 10, 12 are toroidal-shaped cores, the magnets 15, 17 will partially saturate the toroidal core 12 but not the core 10 when they are in this position. If the magnetic elements 10, 12 are elongated linear tubular elements with the wires 11, 13 traversing their longitudinal axis, the magnets 15, 17 will completely saturate the portion of the magnetic element 12 that lies between them; but the other portions of the longitudinal elements 10, 12 will remain substantially unsaturated. In the case where the elements 10, 12 are elongated elements, the permanent magnets 15, 17 are preferably elongated permanent magnets which have a length that is slightly shorter than the length of the tubular elements 10, 12. A detailed discussion of this type of element is found in U.S. patent application Ser. No. 518,310 filed Oct. 29, 1974, in the name of Victor M. Bernin and assigned to the assignee of the present application; and this application is hereby incorporated herein by reference.

If a higher temperature T' is to be sensed, this can be accomplished by moving the permanent magnets 15, 17 so that the line II—II substantially bisects the magnets 15, 17. When the permanent magnets 15, 17 are positioned so that the line II—II bisects them, the inductance vs. temperature characteristic 10', 12' curves will be shifted to a different location so that the curves now intersect at the temperature T' represented by the intersection point 39. Both elements 10, 12 are substantially equally effected by the magnets 15, 17 when they are in this position.

If the magnets 15, 17 are positioned so that the lines I—I substantially bisect them, the inductance vs. temperature curves 10', 12' are shifted so that they intersect at the point 41 where the still higher temperature T'' may be sensed. Thus, by adjustment of the movable magnets 15, 17 adjacent the elements 10, 12, the inductance vs. temperature characteristic of the circuit of FIG. 1 may be changed without disassembly of the circuit and a wide range of temperatures may, therefore, be sensed merely by adjustment of the magnets 15, 17.

The temperature that is to be sensed may also be adjusted over a relatively narrow range by the control wiper 25 which is connected to the secondary windings 22, 24 of the transformer 26, or alternately by the utilization of a saturable transformer winding and at least one movable magnetic control element, such as the magnet 27, which is magnetically coupled to these windings.

While the inductance of the curve 10' preferably increases with increasing temperature and the inductance of the curve 12' preferably either decreases or remains relatively constant, this is not a necessary requirement. Unlike the temperature compensating elements of the previously mentioned Bardash et al. patent, it is not necessary for the permeability of one core to increase while the other core decreases, it being sufficient that the inductances vs. temperature characteristics of the two cores merely vary differentially so that they intersect at the desired temperature to be sensed.

Figure 3:
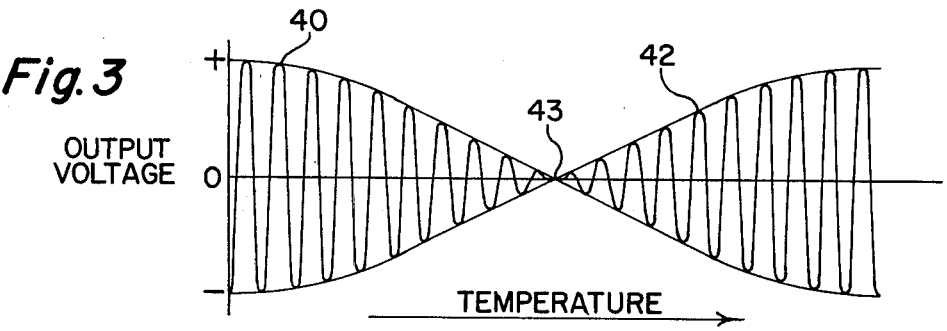
FIG. 3 is a diagrammatic illustration showing an output voltage signal vs. temperature characteristics for the cores of the schematic of FIG. 1.

FIG. 3 illustrates the output signal that is sensed by the null detector 32 of FIG. 1. It is seen that when the temperature is below the sensing temperature, the output signal 40 is of a first phase, but the magnitude of the output signal will decrease as the cross-over point 43 is approached. At the cross-over point 43 no reading is obtained by the null detector indicating that the desired temperature has been reached. As the temperature increases beyond the sensed temperature at the crossover point 43, the output signal 42 is of a phase which is opposite to the phase of the output signal 40 that is obtained for temperatures below the cross-over point 43 and it increases in magnitude as the temperature increases. Although a null detector is one suitable output detector for the present invention because of its simplicity, other type of detectors, including magnitude and phase responsive indicators, may also be employed, if desired.

For certain applications, it is desirable to increase the sensitivity of the sensing circuit over a two active arm circuit as shown in FIG. 1. One way to achieve this is to use the configuration of FIG. 4. The elements 10, 12 of FIG. 4 may be toroidal cores but are preferably elongated tubular elements. The tubular element is threaded by the conductor 19 while the element 12 is threaded by the conductor 21. The conductors 19, 21 are connected to a center tap conductor 23 between the elements 10, 12. The conductor 25 also threads through the element 10, while the conductor 27 threads through the element 12. The conductors 25, 27 are connected to the center tap conductor 29 between the elements 10, 12.

Figure 4:
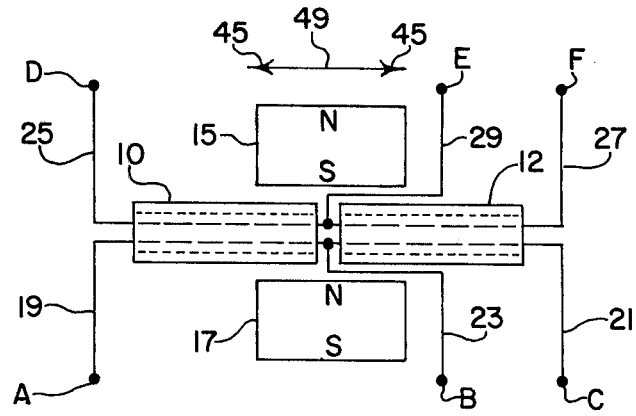
FIG. 4 is a diagrammatic representation of a pair of elongated magnetic elements of different magnetic materials and a pair of adjusting permanent magnets.
Figure 5:
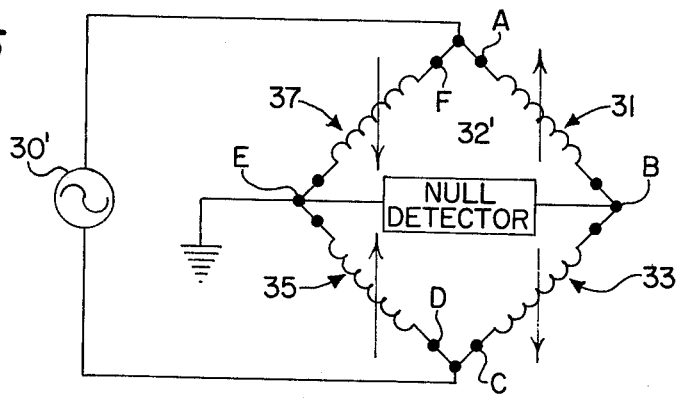
FIG. 5 is a schematic illustration of a four-arm active bridge circuit which utilizes the elements of FIG. 4.

The configuration of FIG. 4, therefore, forms four inductive elements 31, 33, 35, 37, as shown in the circuit of FIG. 5. The inductive element 31 is formed by the core 10 and the conductor 19 which passes through it and which terminates in the terminal A at one end and is connected to the conductor 23 at its other end. The conductor 23 terminates in the terminal B. The inductive element 33 is formed by the core 12 and the conductor 21 and which passes through it and terminates in the terminal C at one end and is connected to the conductor 23 at its other end. The inductive element 35 is formed by the core 10 and the conductor 25 which passes it and terminates in the terminal D at one end and is connected to the conductor 29 at its other end. The conductor 29 terminates in the terminal E which is grounded in the circuit of FIG. 5. The inductance 37 is formed by the core 12 and the conductor 27 which passes through it and terminates in the terminal F at one end and is connected to the conductor 29 at its other end. The embodiment of FIGS. 4 and 5 provides a useful temperature sensing circuit which is further improved by the variable null adjustment provided by the adjustable permanent magnets 15, 17.

In the circuit of FIG. 5, one conductor of an A.C. signal source is connected to the junction of the terminals A and F, and the other conductor is connected to the junction of the terminals C and D. A null detector 32' is coupled between the terminals B and E so that it may sense the temperature at which the bridge circuit of FIG. 5 becomes balanced. Adjustment of the crossover points of the curves 10', 12' may be achieved in this circuit by adjustment of the permanent magnets 15, 17 in the directions indicated by the arrowheads 45 of the arrow 49 of FIG. 4.

Figure 6:
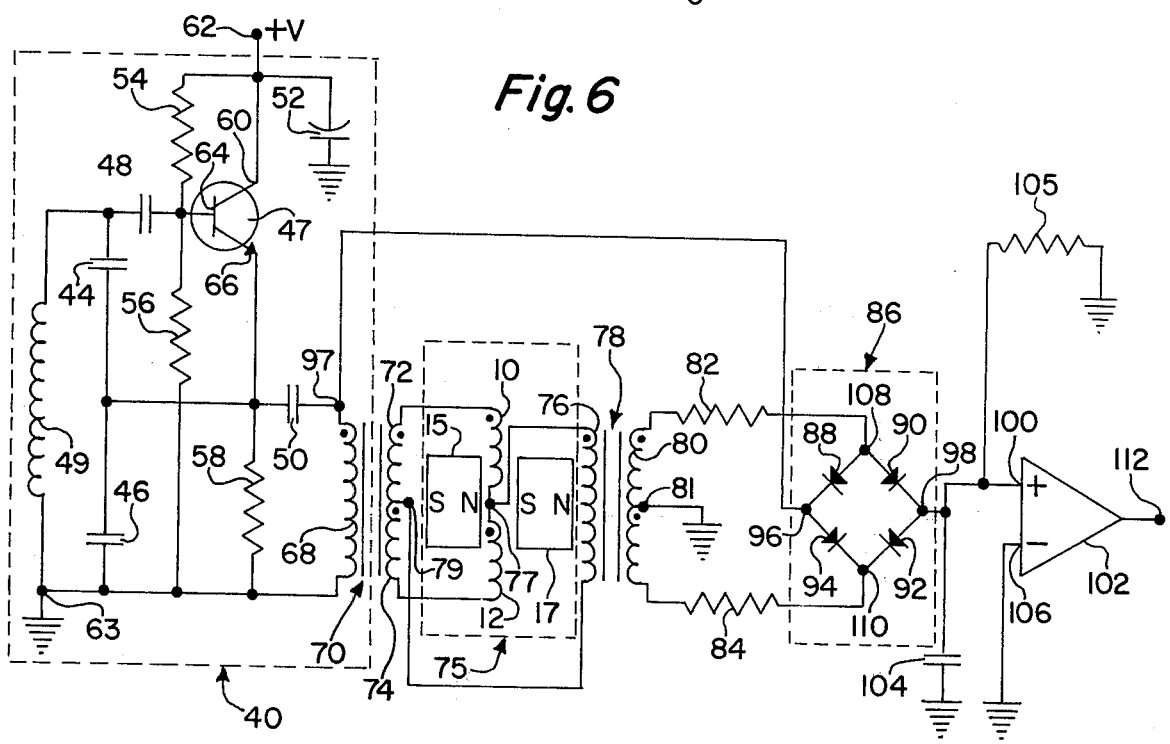
FIG. 6 is a schematic diagram which shows a circuit with a differential amplifier output and a synchronous detector which is utilized in conjunction with the temperature sensing elements of FIG. 1.

A sensing circuit is shown in FIG. 6 which may incorporate the sensing unit 14 of FIG. 1, which may be positioned at a remote location from the remaining portion of the circuitry of FIG. 6. An A.C. oscillator 40 of the Colpits type is used to supply a signal. The oscillator employs the transistor 47, the frequency determining coil 49, the frequency determining capacitors 44, 46, the coupling capacitors 48, 50, the de-coupling capacitor 52 and the resistors 54, 56, 58. The collector 60 of the transistor 47 is connected to the terminal 62 which is coupled to a positive voltage supply. The base 64 of the transistor 47 is coupled to the junction of the bias resistors 54, 56 and to the coupling capacitor 48. The other end of the resistor 54 is connected to the terminal 62, while the other end of the resistor 56 is connected to ground at the terminal 63. The resistor 58 is connected between the emitter 66 of the transistor 47 and ground at the terminal 63. The output of the oscillator 40 at the emitter 66 of the transistor 47 is coupled through the coupling capacitor 50 to the primary winding 68 of the output transformer 70. The secondary windings 72, 74 of the output transformer 70 are coupled into a bridge circuit 75 in which the magnetic elements 10, 12 of the unit 14 form the active elements. The polarity of the windings 68, 72 and 74 of the transformer 70 and of the magnetic elements 10, 12 are shown in FIG. 6 by means of dots in which the dots indicate a like polarity for each winding of magnetic element so marked.

The output of the bridge circuit 75 is coupled to a primary winding 76 of the transofrmer 78. One end of the primary winding 76 is connected to the junction point 77 of the cores 10, 12 and the other end is connected to the junction point 79 of the winding 72, 74. The secondary winding 80 of the output transformer 78 has a center tap grounded terminal 81 and is coupled through a pair of resistors 82, 84 to a synchronous detector circuit 86 which is made up of four interconnected diodes 88, 90, 92 and 94 as shown in FIG. 6. The transformer 78 could be omitted, if desired, by connecting junction points 77, 79 directly to the resistors 82, 84.

The junction 96 between the diodes 88 and 94 is connected to the junction of the coupling capacitor 50 of the oscillator 40 and one end of the primary winding 68 of the transformer 70. The junction 98 between the diodes 90 and 92 is connected to the noninverting input terminal 100 of a differential amplifier 102. A capacitor 104 is connected between the noninverting input terminal 100 and ground in order to smooth out input signal to obtain a more constant DC level. The resistor 105 in connected between the inverting input terminal and ground to "bleed off" or discharge the charge stored by the capacitor 104. The inverting input terminal of the amplifier 102 is connected directly to ground. Thus, an input signal from the oscillator 40 is connected directly to ground. Thus, an input signal from the oscillator 40 is impressed across the terminals 96, 98 while the signal from the bridge circuit 75 is impressed across the terminal 108 at the junction of the diodes 88, 90 and the terminal 110 at the junction of the diodes 92, 94 of the synchronous detector 86. The terminals 108, 110 are also connected to the resistors 82 and 84, respectively, The graph of FIGS. 7a and 7b respectively shows the voltage vs. temperature characteristic at the noninverting input terminal 100 and at output terminal 112. If the ambient temperature around the Unit 14 is less than the temperature at the point 114 where the curve of FIG. 7a crosses the voltage axis, the inductance of the element 10 will be substantially smaller than the inductance of the element 12. In this case, a relatively large positive voltage will appear on the junction point 108 and a relatively large negative voltage will appear on the junction point 110 simultaneously with the appearance of a positive voltage on the terminal 96 that is somewhat greater than the positive voltage on the terminal 108. The diode 94 will thus be forward biased and the cathode of the diode will be at a positive voltage level since the junction point 96 is directly connected to the junction point 97 while the junction points 108, 110 are coupled to the secondary winding 84 through the resistors 82, 84. The positive voltage on the cathode of the diodes 88, 92 reverse biases these diodes. Thus, only the diode 90 is forward biases by the positive voltage on the terminal 108 so as to charge the capacitor 104 and to supply current into the noninverting input terminal 100 of the amplifier 102. With current flowing into the noninverting input terminal 100, the voltage on the output terminal 112 of the amplifier 102 will be at a high level, as shown in FIG. 7b.

When a negative voltage is present on the terminal 96 and a negative voltage is present on the terminal 108 with a positive voltage present on the terminal 110, there will be no substantial conduction through any of the diodes of the synchronous detector 86. Thus, current flows through the diode 90 into the input terminal 100 only during one half cycle of oscillation of the oscillator 40.

As the temperature changes so that the inductances of the elements 10, 12 become equal, the voltage supplied by the winding 80 across the terminals 108, 110 drops substantially to zero. Thus, current will continue to flow through the forward biased diode 94, but the diode 90 will not conduct. The voltage at the junction 98 is shown in the temperature vs. voltage characteristic of FIG. 7a where the point 114 is the point at which the voltage drops to substantially zero, when the inductances of the elements 10 and 12 are equal. Without current flow into the input terminal 100 of the amplifier 102 the amplifier will change status so that a sharp transition of the voltage at the terminal 112 to a low level occurs at the point 114, as shown in FIG. 7b of the drawings.

If the temperature continues to increase the inductance of the core 12 becomes less than the inductance of the core 10, then when the voltage at the junction 110 is positive and the voltage at the junction 108 is negative, the voltage at the junction 96 will be positive. In this instance, all of the diodes 88, 90 and 92 will be reversed biased while only the diode 94 may be forward biased. As the junction 96 becomes negative, however, the voltage on the junction 108 becomes positive with respect to the voltage on junction 110. The diodes 88 and 92 will then become forward biased, and this will bring the anode of the diode 92 to a negative voltage level. Thus, for temperatures greater than the temperature at the crossover point 114 the output terminal 112 will be at a low level as shown in FIG. 7b.

As the temperature reaches the cross-over point 114 from a lower temperature any positive voltage stored across the capacitor 104 will be drained off through the diode 92. Similarly as the temperature reaches the crossover point 114 from a higher temperature any negative voltage stored across the capacitor will be drained off through the diode 90. Thus, the transistion on the output terminal 112 of the amplifier 102 at the crossover point 114 will be delayed for a short time as any accumulated charge on the capacitor 104 is discharged. The circuit of FIG. 6 is also useful without the adjustable permanent magnets 15, 17 but this additional feature allows for easy adjustment of the temperature which is to be sensed without disassembly of any part of the circuit.

The invention is claimed as follows:

1. A temperature sensor comprising first and second inductively wound magnetic cores having different inductance vs. temperature characteristics so that the inductance vs. temperature characteristics of the two cores intersect at the temperature which is to be sensed, a source of voltage coupled to said inductively wound cores, sensing means coupled to said cores to detect when said inductances of said cores are approximately equal and permanent magnet means positioned adjacent said cores and adjustable with respect to the position of said cores so that said sensor will sense temperature over a range of temperatures.

2. A temperature sensor as claimed in claim 1 wherein said sensing means comprises null detection means which senses when the impedances of said inductively wound cores are approximately equal.

3. A sensor as claimed in claim 1 wherein each of said cores comprises a cylindrical, elongated, hollow tube having an elongated axis and constructed of material which is magnetically saturable, at least one sense wire passes through said tube in a direction parallel to said elongated axis of said tube and said permanent magnet means comprises a pair of oppositely polled diametrically opposed magnets positioned adjacent the outer periphery of said tube which completely magnetically saturate the portion of said tube which is disposed intermediate said magnets, but which are substantially ineffective in magnetically saturating the remaining portion of said tube.

4. A temperature sensor comprising first and second inductively wound magnetic cores having different inductance vs. temperature characteristics so that the inductance vs. temperature characteristics of the two cores intersect at the temperature which is to be sensed, both of said cores having a pair of windings associated therewith so as to form two inductive impedances for each of said cores which are interconnected to form a four-arm active bridge circuit, a sensing device coupled across the remaining two terminals of said bridge circuit and adjustable permanent magnet means positioned adjacent said cores and adjustable with respect to the position of said cores so that said sensor will sense temperature over a range of temperatures.

5. A sensor as claimed in claim 4 wherein each of said cores comprises a cylindrical, elongated hollow tube having an elongated axis and constructed of material which is magnetically saturable, at least one sense wire passes through said tube in a direction parallel to said elongated axis of said tube and said permanent magnet means comprises a pair of oppositely polled diametrically opposed magnets positioned adjacent the outer periphery of said tube which completely magnetically saturate the portion of said tube which is disposed intermediate said magnets, but which are substantially ineffective in magnetically saturating the remaining portion of said tube.

6. A temperature sensor comprising first and second inductively wound magnetic cores having a different inductance vs. temperature characteristics so that the inductance vs. temperature characteristics of the two cores intersect at the temperature which is to be sensed, first and second inpedances interconnected with said first and second inductively wound cores to form a four-terminal bridge circuit, a source of voltage coupled across two terminals of said bridge circuit, a sensing device coupled across the remaining two terminals of said bridge circuit and adjustable permanent magnet means positioned adjacent said cores and adjustable with respect to the position of said cores so that the impedance elements formed by said cores may be selectively varied so that said sensor will sense temperature over a range of temperatures.

7. A temperature sensor as claimed in claim 6 wherein said sensing device is a null detector which senses when the impedances of said inductively wound cores are approximately equal.

8. A temperature sensor as claimed in claim 6 further comprising a transformer having a primary and two secondary windings wherein said source of voltage is an alternating current source, said primary winding is coupled to said voltage source and said secondary windings comprise first and second impedance arms of said bridge circuit.

9. A temperature sensor as claimed in claim 8, comprising adjustable means associated with said transformer for adjusting the response of said sensor so that said sensor will sense temperature over a range of temperatures.

10. A sensor as claimed in claim 6 wherein each of said cores comprises a cylindrical, elongated, hollow tube having an elongated axis and constructed of material which is magnetically saturable, at least one sense wire passes through said tube in a direction parallel to said elongated axis of said tube and said permanent magnet means comprises a pair of oppositely polled diametrically opposed magnets positioned adjacent the outer periphery of said tube which completely magnetically saturate the portion of said tube which is disposed intermediate said magnets, but which are substantially ineffective in magnetically saturating the remaining portion of said tube.

* * * * *